(12) United States Patent
Mansikkaniemi et al.

(10) Patent No.: US 8,351,994 B2
(45) Date of Patent: * Jan. 8, 2013

(54) WIRELESS TERMINAL DEVICE WITH USER INTERACTION SYSTEM

(75) Inventors: Tapio Mansikkaniemi, Espoo (FI); Charlotta Willstedt, Linkoping (SE); Marcus Davidsson, Linkoping (SE); Samu Paajanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,593

(22) Filed: May 17, 2011

(65) Prior Publication Data

US 2011/0219336 A1    Sep. 8, 2011

Related U.S. Application Data

(63) Continuation of application No. 09/725,247, filed on Nov. 29, 2000, now Pat. No. 7,970,437.

(51) Int. Cl.
*H04B 1/38* (2006.01)
(52) U.S. Cl. ............... 455/566; 455/556.1; 455/557
(58) Field of Classification Search ............ 455/566, 455/557, 552.1; 345/157, 163, 173, 174, 345/175
See application file for complete search history.

(56) References Cited

U.S. PATENT DOCUMENTS

| | | | |
|---|---|---|---|
| 5,805,164 A | 9/1998 | Blum et al. | |
| 5,809,415 A | 9/1998 | Rossmann | |
| 5,923,327 A | 7/1999 | Smith et al. | |
| 5,937,417 A | 8/1999 | Nielsen | |
| 6,009,336 A | 12/1999 | Harris et al. | |
| 6,078,935 A | 6/2000 | Nielsen | |
| 6,211,858 B1 | 4/2001 | Moon et al. | |
| 6,263,332 B1 | 7/2001 | Nasr et al. | |
| 6,334,126 B1 | 12/2001 | Nagatomo et al. | |
| 6,336,137 B1 | 1/2002 | Lee et al. | |
| 6,590,568 B1 | 7/2003 | Astala et al. | |
| 6,593,944 B1 * | 7/2003 | Nicolas et al. | ........... 715/744 |
| 6,826,597 B1 | 11/2004 | Lonnroth et al. | |
| 7,047,033 B2 | 5/2006 | Wyler | |
| 2004/0177148 A1 | 9/2004 | Tsimelzon, Jr. | |

FOREIGN PATENT DOCUMENTS

WO    WO 00/11850 A1    3/2000

OTHER PUBLICATIONS

"Parameterized XSL Style Sheets," Research Disclosure, Kenneth Mason Publications, No. 423, Jul. 1999, pp. 1009-1011.

(Continued)

*Primary Examiner* — Temica M Beamer
(74) *Attorney, Agent, or Firm* — Ditthavong Mori & Steiner, P.C.

(57) ABSTRACT

A wireless terminal device having network access is disclosed. Selection of menus is simplified by allowing selection of more than one input such as direct touching of the screen, virtual keyboards or roller buttons. A focus marker in the form of a border around a field may be used to limit the area of selection. An object menu icon is visible without needing a right click of a mouse to make selection of the menu easier. The selection of options is localized and parsed at the network server before a response to the user selection is sent back to the terminal.

20 Claims, 8 Drawing Sheets

OTHER PUBLICATIONS

Final Office Action for parent U.S. Appl. No. 09/725,247, May 19, 2004, pp. 1-11.

Hoff et al., "Analysis of the General Packet Radio Service (GPRS) of GSM as Access to the Internet," IEEE, 1998, pp. 415-419.

Office Action for parent U.S. Appl. No. 09/725,247, Apr. 8, 2008, pp. 1-8.

Office Action for parent U.S. Appl. No. 09/725,247, Jan. 4, 2007, pp. 1-8.

Office Action for parent U.S. Appl. No. 09/725,247, Nov. 4, 2009, pp. 1-14.

Office Action for parent U.S. Appl. No. 09/725,247, Nov. 7, 2003, pp. 1-13.

Office Action for parent U.S. Appl. No. 09/725,247, Oct. 9, 2007, pp. 1-12.

Office Action for parent U.S. Appl. No. 09/725,247, Sep. 15, 2010, pp. 1-8.

Shah, "Presenting XML to the Web," XML Journal, vol. 1, No. 1, Mar. 2000, pp. 18-23.

* cited by examiner

WIRELESS TERMINAL DEVICE WITH USER INTERACTION SYSTEM

CROSS-REFERENCE TO RELATED APPLICATIONS

This application is a continuation of U.S. patent application Ser. No. 09/725,247 filed on Nov. 29, 2000, is related to U.S. patent application Ser. Nos. 09/659,419, 09/609,681, 09/607,369 and 09/607,638 and also related to U.S. patent application Ser. Nos. 09/714,939 and 09/725,249, the entireties of which are incorporated herein by reference.

BACKGROUND OF THE INVENTION

1. Field of the Invention

The present invention relates generally to wireless terminal devices and more particularly to wireless terminal devices having systems for easier interaction between the user and the screen.

2. Discussion of the Background

Portable communication devices, such as wireless telephones, have become very popular and increasingly are able to provide much more than mere telephone access. Such devices have been developed which allow a user to access communication networks such as the Internet from their wireless device.

Such a system has been described in co-pending U.S. patent application Ser. Nos. 09/607,637 and 09/659,416 which describe a mobile display appliance (MDA) system and are entitled "Network with Mobile Terminals as Browsers Having Wireless Access to the Internet and Method for Using Same" which allow access to the Internet from a variety of wireless terminals. In addition to individual access, a server also provides a family level of interaction so that a prearranged group of terminals may all be allowed access to a common group of information as described in U.S. patent application Ser. No. 09/609,581 entitled "Network with Mobile Terminals Having Wireless Access to the Internet and Method for Doing Same". Accordingly, an individual user may be recognized as having access not only to his or her own information, but to common information provided to the family.

Figure 1:
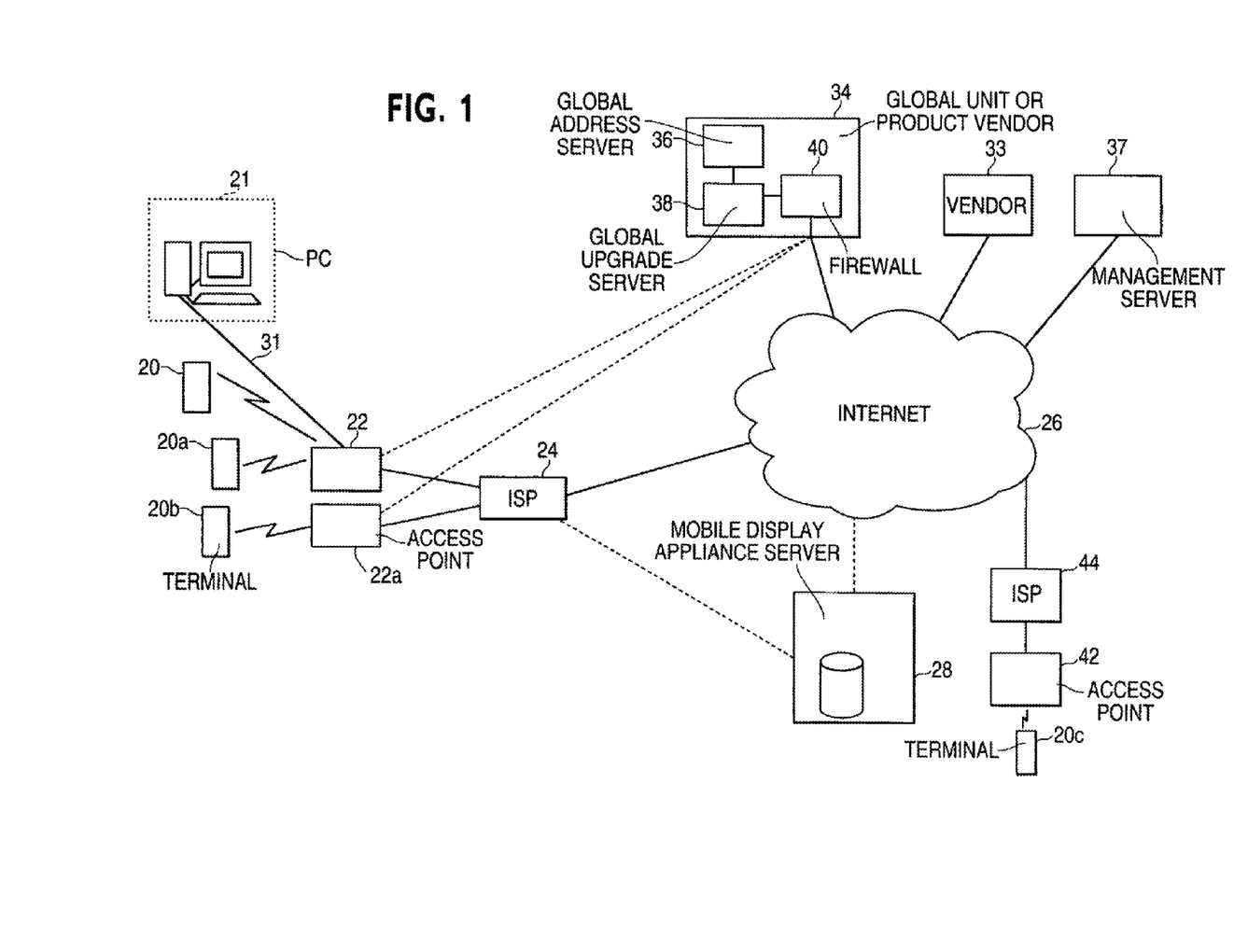
FIG. 1 is a block diagram of a wireless communication system.

An example of such a system is shown in FIG. 1, where the network 10 includes terminals 20, 20a and 20b, each coupled over a wireless system to an access point 22, 42 and a PC 21 coupled by a wired connection 31 to access point 22. The access point is coupled to a network for example owned by an operator of an Internet service provider (ISP) 24, 44, which is coupled to the Internet 26. In addition, the network server, a server of an ISP 24 is coupled to a mobile display appliance server 28 that provides the users with specific services and features through their wireless terminals. Alternatively, access points 22, 44 can be connected directly to mobile display appliance server 28 via any network connection.

It is also possible that a terminal 20c, outside the service area of access point 22, may be connected to mobile display appliance server 28 by being in the vicinity of another access point 42, which then is connected to mobile display appliance server 28 through for example ISP 44, and the Internet or another network.

The access point 22 is also coupled to a global unit or server of a product vendor 34. The address of a global address server 36 is known by the terminal. A direct connection is established between a terminal and a network access point or server of the ISP 24. According to one alternative to the addressing scheme of the system of FIG. 1, an address of mobile display appliance server 28 is received by the terminal and the network node, from which a request to global address server 36 is made. After the terminal 20, 20a-20c has knowledge of the address of the mobile display appliance server 28, a direct link can be made from the terminal to the server 28. The Internet address of the global unit or product vendor 34 and the global address server 36 is permanently contained in the memory of each terminal 20. The global address server 36 is a place from which all the terminals 20-20c may fetch the Internet address of their respective remote mobile display appliance server 28. The initial configuration information and/or the configuration of a direct link is loaded down to the terminal 20-20c from the remote server 36. This information can be updated for example from the server of an ISP, an access service provider or a mobile access provider from time to time. The configuration and the addressing of the terminal 20-20c in the system as well as any direct address link configured to an user interface of the terminal is also transmitted to a remote server when changed. The global unit or product vendor 34 includes a global address server 36 and a global upgrade server 38. The vendor of the system terminal is connected either directly via a network, for example the Internet, to each remote mobile display appliance server 28 or connected in a more centralized way first to the server of the terminal vendor and from there to each server 28. The advantage of having the terminals store the Internet address of the global address server 36 is that if a terminal 20-20c is relocated near another access point 22, 42, then the terminal may still obtain the Internet access location of mobile display appliance server 28 simply by knowing the Internet address of the global address server 36. It would also be possible, to instead have a system where the address of the mobile display appliance server 28 is stored in the terminal 20-20c and the memory is updated as needed. The mobile display appliance server 28 authenticates, using the unique identity of the terminal 20-20c, the access privileges of the terminal to be a shared or to have a group access privileges. Accordingly, the terminal 20-20c is authenticated and logged onto the mobile display appliance server 28 to begin a shared session at a shared or group level.

After the terminal has been authenticated and the terminal 20-20c has received, the downloaded configuration information of services, user interface and links are configured concerning the services and the main view of the user interface. Then the terminal 20-20c is ready to be used. Each terminal 20-20c includes a unique identification (ID). The IDs are reserved and used by members belonging to the same group. Each unique identification of a group of the terminals 20-20c is recognized in the same mobile display appliance server 28 to be used by the members of the group. Every member belonging to a respective group may use the same terminal. Each of the terminals including a unique terminal identification is switched on. Each terminal belonging to the same group makes a request from the global address server 36. The address of the mobile display appliance server 28, in which the applications and services are stored, are ready to be used. Then, each of the terminals 20-20c belonging to the same group obtains the address of the same mobile display appliance server 28 to which each of the terminals is connected. Thus, the user can now access services or retrieve information from the mobile display appliance server 28 or the Internet 26.

In addition to the terminal accessing and using the services of the group, the terminals 20-20c can be used to access services of an individual user.

The user profile and terminal specific user interface configuration settings, as well as possible software components or program updates to the mobile display appliance server 28, are controlled and performed by a configuration tool manager of a management server (not illustrated). Configuration change may affect both the mobile display appliance server 28 and/or the terminal 20-20c. In order for the user to initiate an individual session and retrieve individual information, the user must use the terminal 20-20c and provide further authentication to the mobile display appliance server 28 to gain an access at the individual level. Either at a shared/group or at individual level, the user is able to retrieve the information related to the group of users as well as browsing the Internet 26 to retrieve information.

The mobile terminal to be used can be ordinary PC 21 and a wireless modem for establishing a wireless connection via a mobile service operator to the mobile display appliance server 28, which has capability to be in connection to the network. A mobile terminal 20-20c can be a terminal described in patent application Ser. Nos. 09/607,637, 09/659,416 and 09/609,581.

Figure 2:
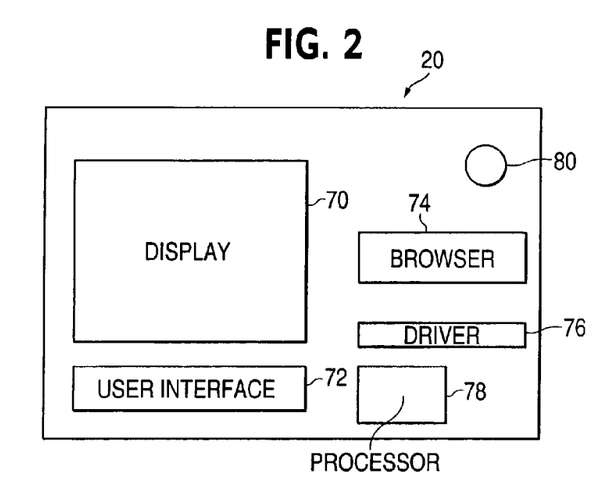
FIG. 2 shows a terminal of the wireless communication system.

FIG. 2 is a more detailed block diagram of a terminal 20-20c, which shows as a calendar application on the display operating within the system shown in FIG. 1. Referring to FIG. 2, the terminal 20-20c includes a display 70, a user interface (UI) framework 72, a browser 74, a driver 76, and processor 78. Each element is shown here for reference only, and the location of each element is not intended to be a defined location of one element relative to the other elements. For example, the user interface 72 may be in or part of the display, or independent of the display.

When the user accesses a service, like a calendar service, or retrieves information from the mobile display appliance server 28, the browser 74 is the program product that is in charge of conveying the service specific information and the main view of the selected application such as calendar service from the mobile display appliance server 28 to the terminal 20-20c.

Figure 3:
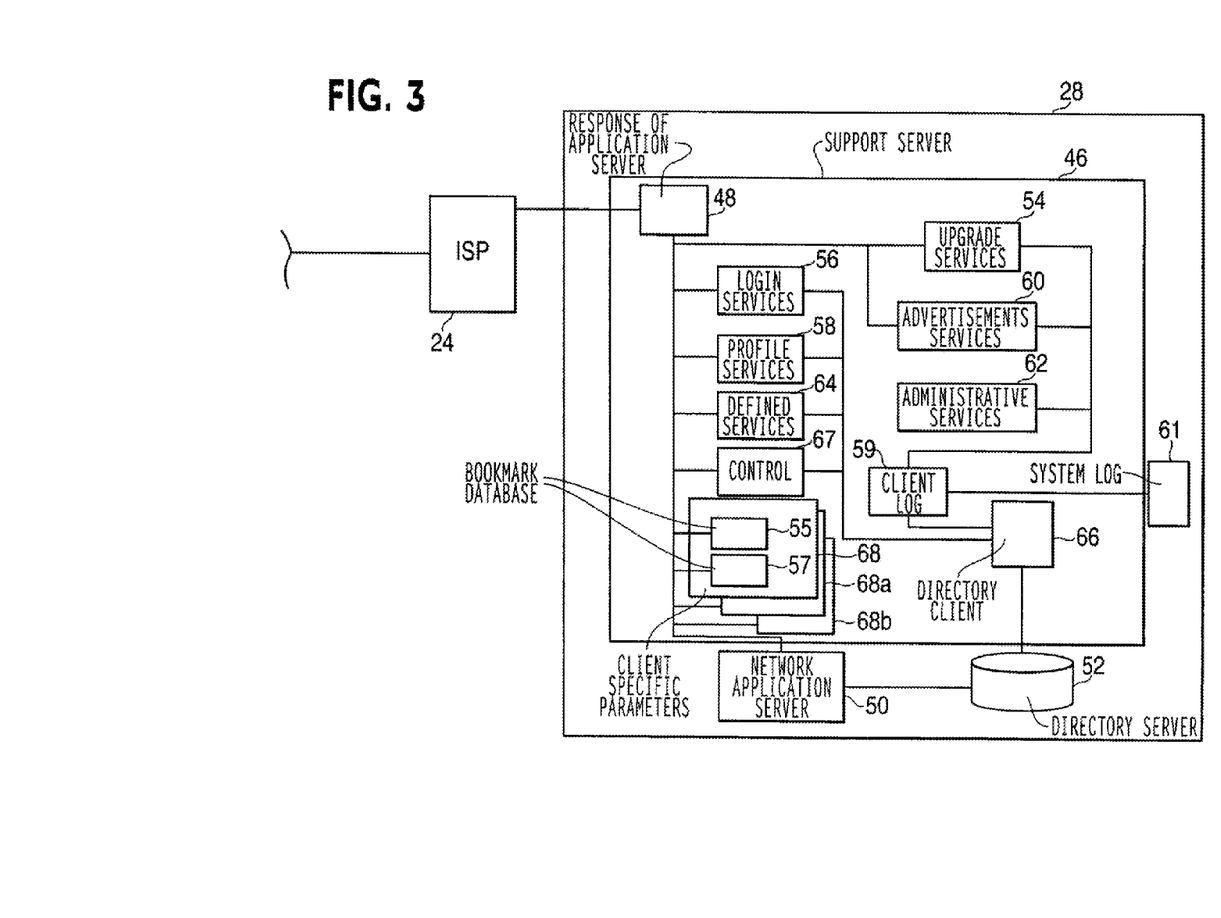
FIG. 3 shows a server of the wireless communication system.

FIG. 3 is a more detailed block diagram representation of the server of the system of the network shown in FIG. 1. In FIG. 3, the mobile display appliance server 28 includes a support server 46, a response handler or application server 48, a network application server 50, and a directory server 52. As would be appreciated by one of ordinary skill in the art, the referenced connections do not depict the physical connections between the elements and are merely logical connections. The support server 46 provides services oriented towards enabling and supporting the services provided to the terminals 20-20c. The support server 46 includes an upgrade service unit 54, a bookmark service database unit 55, a login services unit 56, a bookmark database 57, a profile services unit 58, a client log unit 59 for collecting information about clients, an advertisement services unit 60, a system log unit 61 for collecting information about events in the mobile display appliance server 28 from the client log unit 59, an administrative services unit 62, a defined services unit 64, and a directory client unit 66.

Still referring to FIG. 3, the upgrade services unit 54 is dedicated to controlled software upgrades of the software for the support server 46. Updates are transmitted from the global upgrade server 38 to the upgrade service unit 54. The login services unit 56 provides for authentication of the user and the terminals 20-20c that is being used to access the services, based on information provided by the client unit 66. Additionally, the login services unit 56 is also responsible for log-off activities, such as individual session termination. The profile services unit 58 provides for modifying a user's profile information. This modification of a user's profile may include modifying the group and individual information and preferences. The administration services unit 62 provides for administration of the support server 46 and the application server 48. The software product updates are transmitted from the global upgrade server 38 and its configuration tool manager (not illustrated) to the upgrade service unit 54 and its configuration tool client (not illustrated). The configuration tool client is the functional unit that acts when any configuration tool manager of a management server in FIG. 1 (not illustrated) upgrades any software component, full executable software program or re-configures configuration parameters; application and system parameters.

In FIG. 1 a firewall 40 protects the connection to and from the global unit 34. It will be apparent to those skilled in the art that the firewall unit 40 functions to provide secured access to the global address server 36 and the global upgrade server 38.

In FIG. 3 the advertisement services unit 60 provides for the mobile display appliance server 28 to tailor advertisements to the user and the terminals 20-20c according to the user's profile information. The defined services unit 64 is a classification of "other services" containing items such as bookmark management services, help services, and log services, name management services, and general management services. The directory client unit 66 is coupled to the directory server 52 to provide client verification.

In FIG. 3 the remote register management and control unit 67 knows the closest or the global terminal validation register address. The control unit 67 may also interpret the answer received from the register address. Typically, during browser login action of the terminals 20-20c, the mobile display appliance server 28 individually manages the client specific parameters 68. The management information from one terminal browser session is stored and used after a request is received from an identified terminal 20. Other requests received from terminals 20-20c involving different identification information (IDs) use browser client specific parameters (68a, 68b) which may result in, for instance, seeking of bookmarks for the terminals when an action request originated from the terminals.

In FIG. 1. the terminals 20-20c may have access through proper authentication and from service purchases of a third party publications which are available from a vendor 33, such as news related information found in magazine publications or from daily newspapers.

The user interface of the terminals 20-20c the user alternative selections of how to select a command and a target of the command in a main menu of the terminal view (the same that is presented when the terminal is powered on) or in an application for example a calendar. In the terminals 20-20c there may exist a hard button, which the user may press at any time using any service of the system which then results in the next view being changed to the main family view (or main individual view if the PC 21 is used having a connection to access point 22 via wire connection 31).

Depending on the service application in use, a user selection and a command from the terminal interface may affect the information of the service used by the group members. The authenticated group member may change for example the group calendar content according to given command in such a way that other authorized members of the same group obtain the latest group calendar information from the mobile display appliance server 28.

Thus, by utilizing this MDA system, it is possible to obtain information on a wireless device through a server and the Internet. Because the content is being handled by different systems having different protocols, it is necessary to convert the content from one system to another as the data is being passed back and forth. Thus, each page being viewed is defined as an XML page template, which is parsed with general MDA components. The information is then passed by way of a localization menu, which generates the view into the users defined language. Next, in the localization script, parsing results finally in a HTML page ready for the terminal.

Thus, the three previous stages are used to correct the fourth stage final conversion, which feeds in the actual content of the application like e-mail or calendar content. The result is an HTML page, which is presented in the terminals 20-20c.

This application is related to co-pending U.S. patent application Ser. No. 09/607,369, filed on Jun. 30, 2000, entitled "User Interface Constructed from Components Created from a Set of Tags", which provides a method for generating display instructions by converting templates containing style information into a final format, which converts for example data created in one language into a second language. The invention provides a method for converting one machine-readable language for example XML or XSL into another for example HTML, by applying instructions to style templates. The invention provides a high level construct created from a set of lower lever tags. Those tags may be grouped and the new grouping be represented as a new tag, that may be referred to as a component. A man machine interface (MMI) of a terminal, may be created by using constructs. The tags can be understood to be system components for example in XSL format When the user operates the wireless device to obtain information through the Internet, it is often necessary or possible to use a menu arrangement in order to select various possibilities on the screen. Such selection is done easily on a non-portable device such as a PC, where a mouse or other device may be utilized to control a cursor on the screen.

Figure 4:
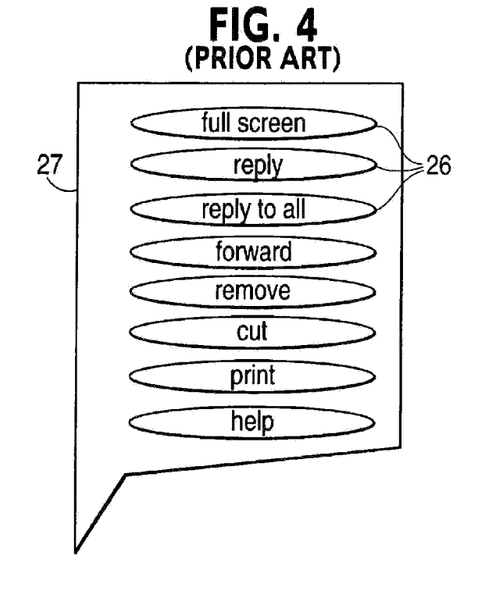
FIG. 4 is a view of a prior art screen.

FIG. 4 shows a screen, which is available using a Microsoft Windows arrangement. It is noted that the selected icon (not illustrated) for Microsoft Word was highlighted and as a result a drop down menu has been made available so that different options may be selected. The menu is made available by placing the cursor on the Microsoft Word icon and right clicking on the mouse. However, in a portable wireless device, the need for additional space and weight makes the use of a mouse impractical. Likewise, because of the limited number of buttons on the device, the use of keys to control the cursor is also difficult. Accordingly, it is desirable to have systems, which are friendly to the user and simple to operate on a wireless device when selecting options from a menu.

SUMMARY OF THE INVENTION

The present invention provides a wireless device having systems, which offer several alternatives for the interaction between the user and a menu on the screen. This is accomplished through several features, which make selections easier.

Accordingly, the present invention provides systems for user interactions with a wireless terminal.

Furthermore, the present invention provides a wireless terminal device having a graphic or a view containing a list based on a user interface system for a user to interact with menus on the screen.

The present invention further provides a method for interacting with the screen by providing simplified steps in the selection process.

The present invention further provides a wireless system for interconnecting the wireless device with the Internet and providing a simplified system for selecting options on a menu.

The present invention further provides a wireless system having a focus marker for indicating which section of the screen is being controlled.

The present invention further provides a wireless terminal device having more than one alternative for selecting options from a menu.

The present invention further provides a wireless device in which before a response from a server back to the terminal occurs, localization and component parsing occurs at the server.

The present invention further provides a wireless terminal system where an indicator for a drop-down menu is visible along with an associated object at all times.

The present invention furthermore provides a wireless system for allowing a wireless device to access the Internet through a server and to select options from a menu which appear on the device's screen where a object of interest is indicated by a focus marker, where the selection may be made with more than one device, where the menu is indicated by an icon which is always visible and when the selection is transferred to a server, localization and component parsing is done for data and audio visual user interface elements before responding back to the terminal in such a way that the server side methods support more than one terminal type.

The present invention furthermore provides a wireless system for allowing a wireless device to access the Internet through a server and select options from a menu where any visible service to a user of a group or as an individual user, where selection may be made with more than one device, that applies a direct or indirect pointing method shown with one of several alternative marked selection means. The menu is indicated by an icon which is always visible and the selection is transferred by using a browser application as a bearer application between the terminal and the server user not noticing that the browser is used at the time. The server, localization and component parsing is done for data and audio visual user interface elements before responding back to the terminal in such a way, that the server side methods support more than one terminal type and or the user interface elements are created either in the server or in the terminal.

The present invention furthermore provides a wireless system for allowing a wireless device to access the Internet through a server and select options from a menu. Any visible service to a user of a group or as an individual user can be added or configured from the network to the server. The service to which a selection may be made with more than one device applies a direct or an indirect pointing method which is shown with one of several alternative marked selection means. The menu is indicated by an icon which is always visible. The selection is transferred by using a browser application as a bearer application between the terminal and the server user not noticing the browser is used at the time. The localization and component parsing is done for data and audio visual user interface elements at the server before responding back to the terminal in such a way that the server side methods support more than one terminal type and/or the user interface elements are created either in the server or in the terminal.

Furthermore the present invention can be applied to user interface selection and object menu selection, user given command interpretation and showing the result in the terminal display of a terminal, that is a wireless or connected in a fixed manner to the network access point with the terminal including alternatively one or several sizes of displays.

Furthermore the present invention can be applied to user interface selection, object menu selection, user given command interpretation and showing the result in the terminal display of a terminal, that is a wireless or a terminal connected in a fixed manner to the network access point with the terminal type determining the available and supported selection devices and availability in the user interface view.

Furthermore the present invention can be applied to user interface selection, object menu selection, user given command interpretation and showing the result in the terminal display of a terminal, that is a wireless or terminal connected in a fixed manner to the network access point, with the user interface view being divided into three areas which are service selection tabs, content and advertisement areas when generic web browsing is not the activated application service.

Furthermore the present invention can be applied to user interface selection, object menu selection, user given command interpret and showing the result in the terminal display of a terminal, that is a wireless or a terminal connected in a fixed manner to the network access point, with the content area of the user interface view of the terminal being applied for visualizing, interacting and event functionality of the service independently of the type of the terminal in such a way, that object selection means are the only terminal type part dependent on the usability of the service.

Furthermore the present invention can be applied to user interface selection, user given command interpretation and showing the result in the terminal display of a terminal, which may be wireless, that by selecting a hard button, the user interface view is changed to a main family level view.

Furthermore the present invention can be applied to user interface selection, user given command interpretation and showing the result in the terminal display of a terminal, which may be a wireless terminal, by selecting a hard button, which is configured as a back command of the browser, the user interface view is changed to previous view, Furthermore the present invention can be applied to user interface selection, a toolbar and/or a virtual keypad given a user command that is interpreted and showing the result in the terminal display, which may be a wireless terminal of the system, in such a way, that a user's earlier activated view can be activated without losing the present service view in such a way, that one of the two views of different applications can be selected to be the next content shown in the view.

Furthermore the present invention can be applied to user interface selection and object menu selection for which a user command is interpreted and the result is shown in the terminal display of a terminal, that the available system services, that are selectable from service tabs, may be configured and be downloaded to the terminal from server. The server that is connected to the network may download the required software and data configuration to the server to be used in the main view and the service view as one enabled user or a group shared service.

Furthermore the present invention can be applied to user interface selection and object menu selection for which a user command is interpreted and the result is shown in the terminal display of a terminal. The available system services when selected result in the object menu content including the commands for the selected service.

Furthermore the present invention can be applied to user interface selection and object menu selection for which a user command is interpreted and the result is shown in the terminal display of a terminal. The available system services when selected result in the object menu content including the commands for the selected service and help as guidance to use the service.

Furthermore the present invention can be applied to user interface selection and object menu selection for which a user command is interpreted and the result is shown in the terminal display of a terminal. The available system services when selected, permit the new event objects to be created by the user in such a way that the new event objects are then usable with other users of the group when an event is ready and saved to the server and when later selected by a user object menu the event is visualized including the actions enabled for the created object.

This is accomplished by providing a system where the wireless device is connected to the Internet through a server. The screen on the wireless device includes a focus marker in the form of a dark border, which indicates various portions of the screen to specify which objects are being selected. In addition, the objects on the screen have an indicator, which lets the user know that a menu may be brought up by its actuation. A selection of options within a menu can occur by using a variety of input devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 5:
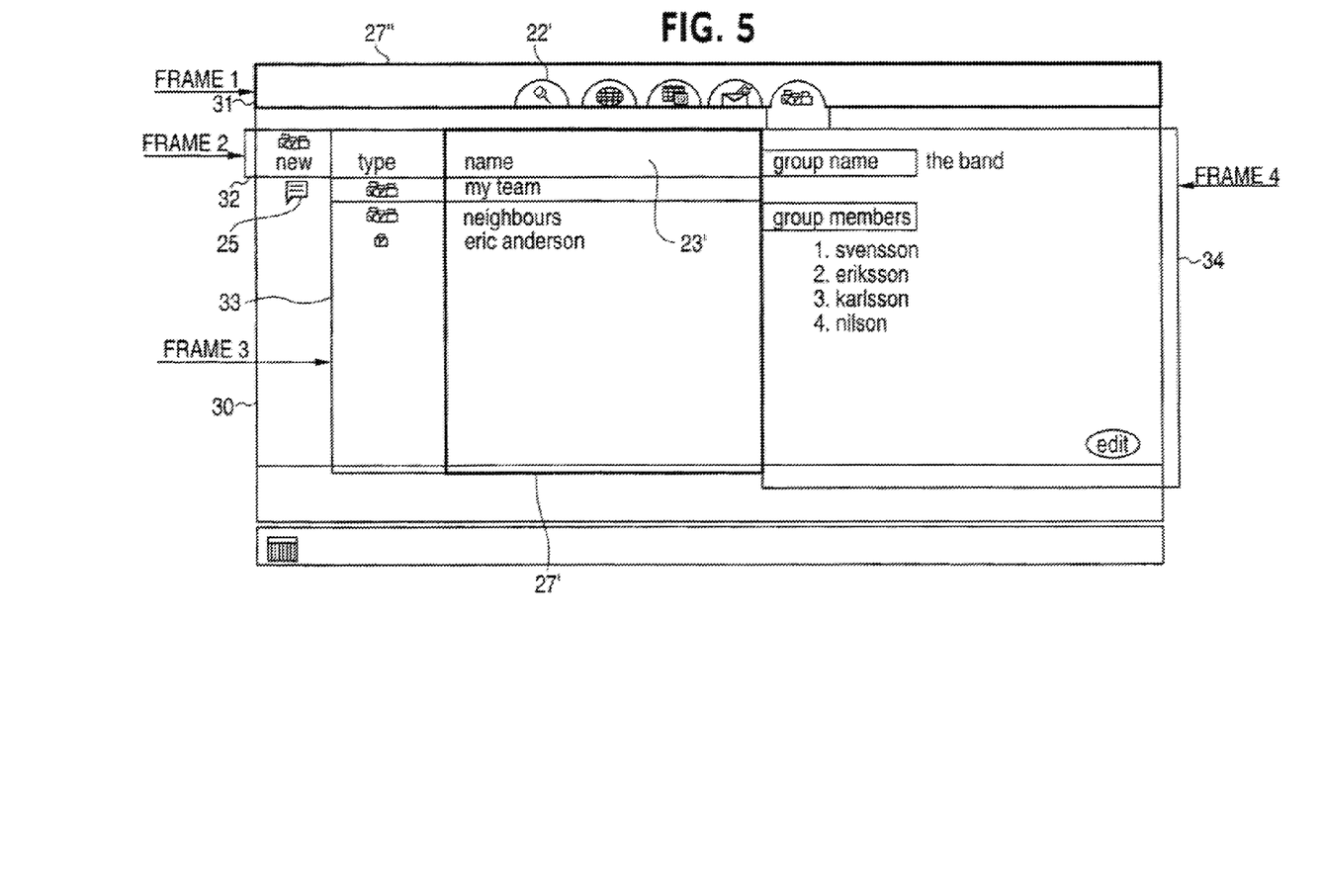
FIG. 5 is a view of a screen according to the present invention.

Referring now to the drawings, wherein like reference numerals designate identical or corresponding parts throughout the several views, and more particularly, to FIG. 5, wherein 30 indicates the view seen in the screen of the wireless device when connected to any family bulletin board through the server as described in U.S. application Ser. No. 09/725,249. Five tabs 22' are shown at the top of the screen to select five different functions, each of which is indicated by a separate icon. Thus, the bulletin board is indicated by a thumbtack, bookmarks for the Internet are indicated by the globe, the family calendar is indicated by a calendar figure, e-mail is indicated by an envelope and a data base of names and address is indicated by a group of people. Since the bulletin board tab has been selected, various notes 32 are seen on the screen as if they are notes on a bulletin board, each held up by a thumbtack. In addition, a series of color selection buttons (not illustrated) are available on the left hand side. An object menu 25 may be invoked by selection of a control button (not illustrated) located in the upper left hand corner.

The control button may be also defined to invoke other user interface features such as a new dialog.

Under previous systems, such object menus can be observed by right clicking on a mouse connected to a PC. However user studies have shown that the non-visual object menu is not used very often. Users are not aware of the possibility to use an object menu for which they are not trained to be used and/or which is not offered in a view of the display of a terminal. An enhanced feature is to have the object menu indication, such as icon 25 available at all times, somewhere on the screen, but essentially close to the selected object after user selection is made. The object menu presentation may be other than an icon. Thus, visualizing an object menu eliminates the need for the user to right click in order to have the object menu appear on the display. By having for example the icon 25 available, it is only necessary to select the control button in order for the menu to appear.

The selection of the control button may be accomplished by several different methods. If the device is provided with a mouse or keyboard, it can be selected by a left click on the mouse or the appropriate use of arrow keys and the enter key on the keyboard. However, since this is not typically available on a wireless device, it is possible to use a touch screen arrangement as is described in several of the related cases described above. The user has to only touch the icon with a finger or a pencil in order to actuate this icon. It is also possible to use a virtual keypad on the touch sensitive screen in order to direct the selection of the icon in a fashion similar to a physical keyboard. It may also be possible to use an integrated roller on the terminal and roller control buttons if they are available. When the user selects the menu icon, it is also necessary to indicate which object this is being applied to.

The marker or selection means that the user can use one of the following: an external mouse that is connected to the terminal; an external keypad that is connected to the terminal; a visual and virtual keypad that is displayed to the touch sensitive screen described in detail in U.S. patent application Ser. No. 09/607,359; direct manipulation selection arrangement made with fingertips or for example a pen to touch sensitive screen user interface selections described in detail in U.S. patent application Ser. No. 09/607,638; and integrated roller(s) in the terminal and roller control buttons (as described in detail in a U.S. patent application Ser. No. 09/607,359).

When the external mouse is used for marking the target into which user's commands are to be directed, marking the target of the command is done typically by pressing one button once (the left most button of the mouse). The application specific command is typically selected from a menu (like Edit menu) and the selected command affects the previously marked target of the command. When the user uses a mouse (or joystick, trackick pad, track ball) as the selection device, the selection or marking is made indirectly to the object.

Alternatively when an external keypad is used, the marking or selection concerning the target of the selected command may be done by moving the active selection point to up, down, left or right with the "arrow buttons". The actual selection or marking is then done by pressing the <enter> button. Also as an alternative to moving the active marking with "arrow buttons" (->, <-, . . . ), the marking point can be moved for instance by pressing the "tab" button and the user interface of the application may move the active marking position from one target to another in such a way, that all the possible targets in one view, one at a time are available to be selectable. Then the command that is to be processed for the selected target is typically given by pressing a button control like for instance the <ctrl> button and at the same time a character button (like "W") or two concatenating character button pressings (like "W" and "O", the first character defining the menu set and the second the command in that menu set or the first character defining the command and the second target where to the response is directed such as for example save to memory). When the user uses for example an arrow (also known as a direction key) as the selection device, the selection or marking is made indirectly to the object.

Alternatively when a virtual keypad is used for the marking or selection, marking the target and giving a command may be done similarly as above described concerning the usage of an external keypad. Instead of using "arrow buttons" or "tabs" to select or mark the target and character or function buttons to give certain commands to select a target, the user may use keypad button selection with fingertips directly to display "the soft keys". The soft keys are the keypad buttons drawn on the touch sensitive display to look like hard button keys of the keypad. Virtual keypad means and methods are described in U.S. patent application Ser. No. 09/607,359. When the user uses the virtual keypad as the selection device, the selection or marking is made indirectly to the object.

When direct manipulation selection is used, the application that is used can be controlled from the user interface. The user first selects the target by directly touching the target area in the touch sensitive display. In the next step, a menu of commands or a command button is selected (from the view if presented at the moment) and in the third step the given command is processed for the selected object. As a result, a status indication of the processed command may be shown in the display of the user interface. The direct manipulation methods are described in U.S. patent application Ser. No. 09/607,638. The terminal user issues commands to the terminal 20 and the mobile display appliance server 28 by using direct manipulation and from menu-type of UI controls (object menu, toolbar etc.). The user either presses the hardware or software button down, keeps a finger on hardware or the software button for a longer period, moves the finger over the touch-sensitive touch screen and lifts the finger from the hardware or software button. All of these basic user interactions—or basic user events—need to be detected by the hardware and software. Hardware and software buttons are therefore at a software level considered identical. From a user interaction point of view, hardware and software buttons are considered to be identical.

Thus, in FIG. 5, the lower note is highlighted with a focus marker 27' in order to indicate that this is a note of interest to which the menu is being applied and the upper note is highlighted with focus marker 27" to indicate that it is also a note of interest. Thus, in this arrangement it is necessary to first indicate the object and then indicate the menu button. It would be possible also to instead include the menu icon on each of the notes so that it would then be necessary to only indicate by a single selection the particular menu icon that is present on the selected object. If, for example, each of the notes includes the same menu icon in the upper right hand corner, the menu for the lowest note may be selected by touching that particular icon so that the menu comes up relating to that particular note. While this arrangement puts extra images on the screen, it makes the selection process easier. It would also be possible to display the entire menu for each object all the time to make selections even easier. However, this would even further clutter the screen.

Figure 6:
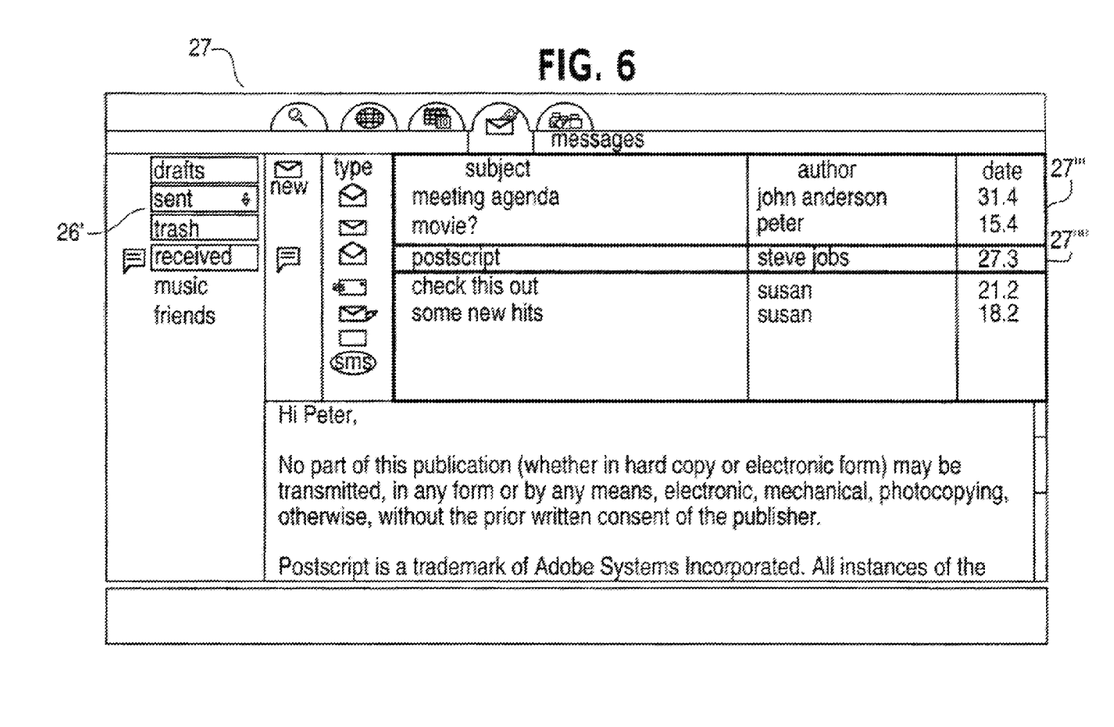
FIG. 6 is an enlarged view of a menu according to the present invention.

FIG. 6 shows a menu 27, which has been displayed after selection. The menu includes a series of options 26', each of which is indicated by a separate button displayed thereon. FIG. 6 also shows highlighted focus markers 27''' and 27''''. This menu is similar to the menu described above in regard to FIG. 4. That is, individual options can be selected from the menu. The particular options in the menu may be selected in the same manner that the menu icon has been selected as described above. That is, the options can be selected using a left click of a mouse, a physical keyboard, a virtual keyboard, and a roller ball or by the touch of a finger or pencil. For example once a particular option is selected, the device operates in accordance with that which is known.

As indicated above, the use of this menu icon makes the selection process easier. By having the object menu icon always available, rather than having the user provide an input by using the selection or marking device, one step in the process is eliminated. Also, by having the icon available on each of the objects, another user interface step is eliminated. This is particularly important in wireless devices since the screen size is quite small and the selection is not as easy as in a full size PC utilizing a mouse.

As indicated above, at least five different methods area available for making selections either directly or indirectly relative to the object on the screen. While different selection and marking devices may have different possible choices for actuation, one important feature is the ability to use more than one type of selection device in a single wireless device. Thus, if a touch screen is available, the user has the option of touching the icon or to use a virtual keyboard to more the icon around. While the touching action is the simplest and most direct, there may be some concern regarding smudging the screen, especially if it is necessary to do a number of selections over the course of the day before it is possible to clean the screen. Also, because the screen is somewhat small, it may be easier to control the selection process using the virtual keyboard rather than using a finger and having a series of errors of the wrong icon being actuated or more than one icon being actuated. This, of course, depends on the dexterity of the person involved, the size of their fingers, etc.

Another reason that a user may not wish to use the touch screen arrangement is that if the user has long fingernails, the fingernail may touch the screen before the finger tip in a slightly different location so that an erroneous is made. This provides the user with options as to which are preferred. Different users may use different options and the same user may choose a different option under a different circumstance.

In addition to having the object menu icon available at all times and having a plurality of menu icons each associated with its specific object, as described above, it is also possible to have more than one object menu for a single object when the object of lowest hierarchy level of event objects of a service or application belong as a subset to another object of a higher hierarchy level of objects in order to separate two different types of features related to the objects of different hierarchy level. Thus, it is possible that two menu icons could be placed on the screen where one menu contains service specific object menu options of for example on one view area and the other menu has item specific object menu options in another view area. For example received e-mails may be the object to which the first object menu icon relates and a specific received email may be the second object to which the other object menu is related. Likewise, it is possible for each object to have two icons with the same separation of features. This will limit the number of options, which the user must select from when the menu appears. The user has to give an acceptable input command for an object since the set of commands, which may be given to an object when one service is used, is dependent of the hierarchy level of the object. This could be extended even further so that each option in the menu has its own menu button, which would eliminate an additional step. However, this would generally be unacceptable since too many menu buttons would be present on the screen.

Another manner in which the selection of options on a screen may be simplified is the use of a focus marker used as a selection marker around a portion of the screen. A focus marker is merely a borderline, which surrounds a portion of the screen in order to limit the selection process to that area.

For example, FIG. 5 shows the screen available under the same system described above, but with the fifth or right hand tab indicated by several people being actuated. This screen shows address book type information for various people and also allows different groups to be described. Thus, the full screen is indicated by number 30. This screen includes a first screen area 31 with the five tab selection buttons. Second screen area 32 includes a small section below the first screen area 31 which includes columns referring to type (i.e. person or group) and name. The third screen area 33 is below the second screen area 32 and includes a list under the headings shown in screen area 32. The fourth screen area 34 is on the right hand side of the second screen area 32 and the third screen area 33 and below first screen area 31 and includes specific information related to the selected listing in the third screen area 33. Thus, in the fourth screen area 34, the first item in the list of the third screen area 33 indicates that "my team" is selected and that this is a group. The fourth screen area 34 indicates the group name and the group members associated with that group.

When the user wishes to make selections using a hardware scroll button or other selection devices such as screen touches, mouse movement, keyboard actuation or focus area marking, it is helpful to limit the screen to a particular screen area which is being selected. This is especially true when using scroll buttons. For example, in FIG. 5 it would not be clear whether one is trying to scroll down the list in the third screen area 33 or the list of members in the fourth screen area 34. By moving the focus marker onto a different screen area, it is possible to limit the possible actuation of different items. Thus, the scroll button will only work with the third screen area 33 if it is indicated by a focus marker. Even if other systems such as a touch screen is utilized, this may be helpful since it will eliminate the possibility of erroneous touches in wrong screen areas.

The operation of the focus markers 27', 27", 27'" and 27"" can be compared to using a tab key on a PC to go between different objects within an application. Thus, the focus button can be moved between screen areas by actuation of a single button or other actuating device so that it moves in sequence between different screen areas. One screen area will normally be set as a default position, such as screen area three. The screen areas may be selected in order using the equivalent of a tab key. The different screen areas may also be selected by another actuating device such as a finger touch, the arrow keys, etc. It should be remembered that the main purpose of the focus marker is to support hardware button inputs on the mobile terminal. Thus, this feature will not occur during browser operations. It should also be noted that certain parts of the screen would not be accessed by any marking or selection device. For example in FIG. 5, there is a area at the bottom of the screen, which is used for advertising and which is not included in any selectable screen area.

For the user interface, that is shown in the terminal display, that is a wireless or fixed terminal connected to the network access point, it is possible to divide the terminal display into three areas which are service selection tabs, content and advertisement areas when generic web browsing is not the activated application service. The service selection tab area in FIG. 5 is the first screen area, from which a specific service application can be initiated. A content area is the screen area indicated as 30 in FIG. 5. The area below the content area may be used, for instance, for advertising.

A specific marker means a marker such as focus marker which may be defined in such a way, that it is used only in the limited area of the screen for example the content area.

A specific marker, such as focus marker, may be defined in such a way, to be used only in the view of the mobile terminal of the system.

When the user wishes to move the focus markers in FIGS. 5 and 6, the action depends on the type of input device. Thus, if a touch screen arrangement is used, the user can only move the focus marker to another object by physically moving the marker visibly over the new object. If a hardware button input is utilized, the user can step the marker between objects in the active screen area by scrolling on the roller button. If the user interface objects are items in one of the lists within the mobile terminal display, moving the focus marker at the same time moves the highlighting to the next object. Using the scroll left/right command, the user can move between screen areas of the surfaces. If the user interface objects are on a public web page, the scroll left/right buttons can also be used to step the focus marker between objects.

It must always be remembered that when using a wireless device to access the Internet or other network, layering of protocols comes into play between the different parts of the system. Thus, with layering of protocols various arrangements must be made to not loose content and to properly interact in a fashion as workable at all levels. For example, when an option it selected from an object menu, it is necessary that the selection be forwarded from the wireless device to the server and then through the Internet so that the connection is then made and the selection option is then displayed by the wireless device. The selected object may be a portrait with a selection marker such as the focus marker and an audio feedback may be played in the terminal when the visual object menu indicator is selected for showing the command selection options for the related object.

Every command, that it selectable from the screen and the object to which the command is directed, is considered user selection information. The selected command can be interpreted as code and the object can be interpreted in a selection data format that may be similarly structured as the command code (like in HTML).

U.S. patent application Ser. No. 09/607,369, entitled "User Interface Constructed From Components Created From a Set of Tags", provides a method for generating display instructions by converting a template containing style information into a final format, which converts for example data created in one language into a second language. That method converts one machine-readable language for example XML or XSL into another language for example HTML by applying instructions to style templates. Now the described sequence is applied in the new page generating process when network server creates the response to the terminal according to the service that is controlled in the mobile display appliance server 28. U.S. patent application Ser. No. 09/607,369 is referred to in the following detailed description, in which the overall functionality from the terminal to the server and the server responding back to the terminal is described thoroughly.

Figure 7:
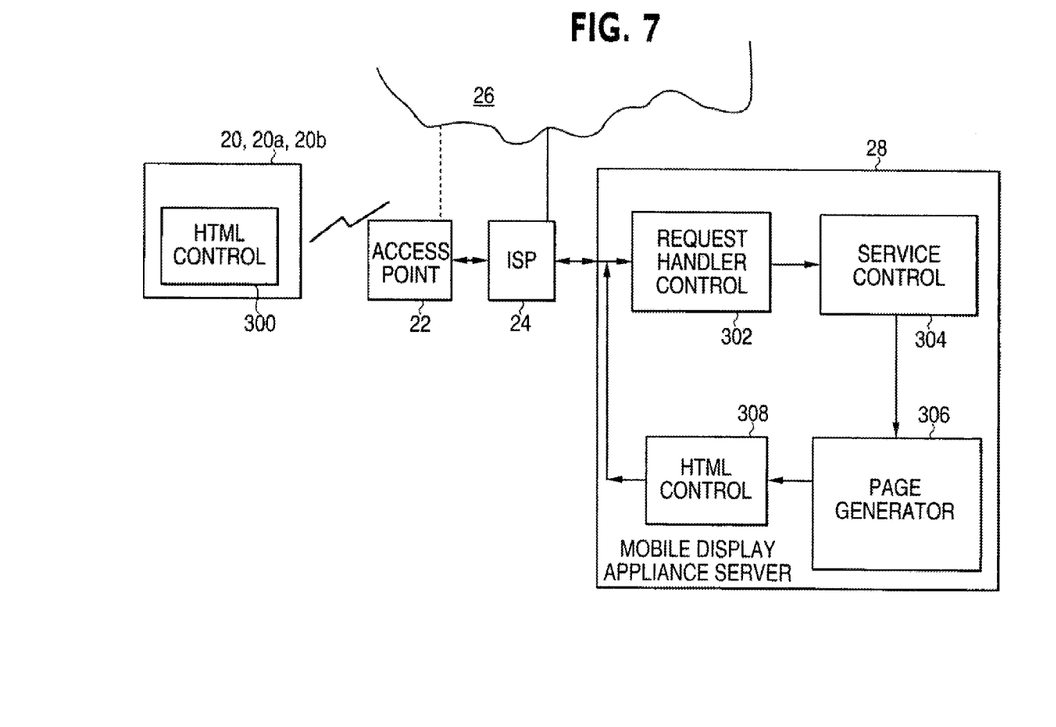
FIGS. 7 and 8 are schematic diagrams showing the handling of commands between a wireless terminal and a server in accordance with the present invention.

FIG. 7 illustrates a terminal 20-20c and mobile display appliance server 28 which are in connection via server of access provider 22 and server of ISP 24. The connection from the terminal to the server of network access provider 22 is the earlier described air interface connection for example WLAN. The connection from the server of the access provider 22 via the server of ISP 24 to the mobile display appliance server 28 of the mobile terminal is made for example by a TCP/IP connection, which is commonly known as an Internet connection. In the terminal 20-20c there is a HTML control 300, that is capable of receiving HTML page information from the mobile display appliance server 28 and displaying it to the terminal's screen. The HTML control 300 also sends all user selection information from the terminal via servers of the access provider and the ISP 24 to the mobile display appliance server 28. The interface between terminals 20-20c and the mobile display appliance server 28 is part of an Application Protocol Layer (APT) Interface.

At the mobile display appliance server 28 side in the FIG. 7 there is a request handler control 302 that receives the HTTP message. The request handler control 302 is in connection with a service control 304. The request handler control 302 forwards the user information according to the service used by the user to the service control 304. Depending on the service in question, the information relative to the session connection and the user given information, the service control 304 creates a response either in XML data and in the name of the XSL template to be used, when the data is processed further in the next stage. The page generator 306 receives the response template to be used and the data, which are further processed in the page generator. The page generator 306 tailors the page according to the active user (which may also be multi user) profile and sends the page to the HTML block 308. The HTML control 308 is the control element in the mobile display appliance server 28 that sends the server's response to the terminal 20-20c as feedback to the user given information. The controls of the mobile display appliance server 28 in FIG. 7 are logical controls. In FIG. 3 the controls of server are presented in such a way, that all the functional blocks of the server are presented in more detail than in FIG. 7. In FIG. 7 the request handler control 302 is illustrated in FIG. 3 as the response or application server. In FIG. 7 the service 304 is illustrated in FIG. 3 as the login services unit 56, profile services unit 58 and defined services unit 64. In FIG. 3 other control units, such as network application server 50, directory services 52, client log unit 59 and the browser units 68, 68a 68b, are supportive control blocks.

Figure 8:
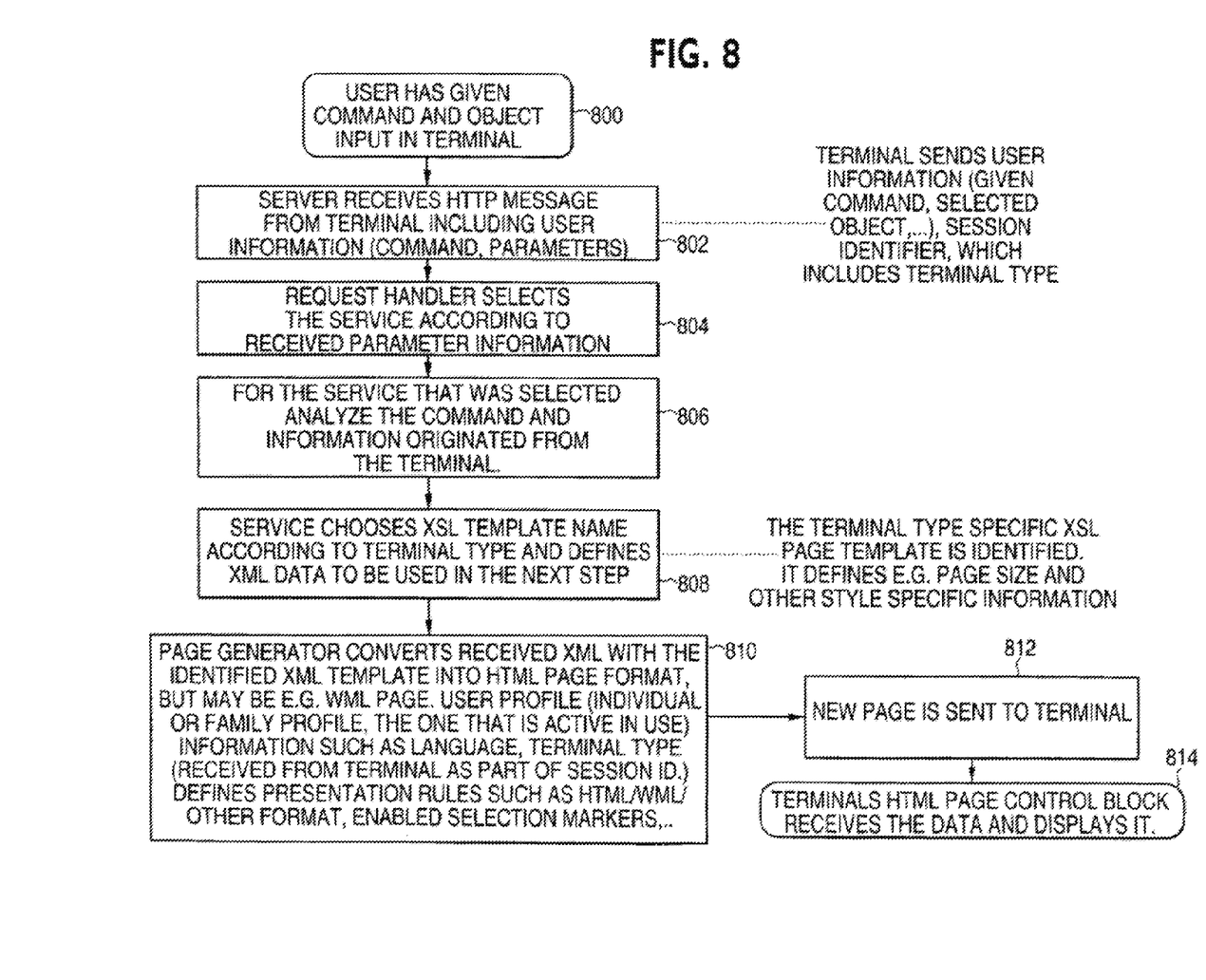

In FIG. 8 after the user information is input in the terminal device, the user interface element in the terminal 20-20c traps the user information selection message in step 800, and sends the selection message to the network from the HTML control 300 by using a HTTP message for example POST or GET. The HTTP protocol is described for example in "Hypertext Transfer Protocol—HTTP/1.1" publication that is today available. The HTTP control 300 of the terminal 20-20c fills in the user selection information, given command, application service, the selected object and information of the connection session identification, which includes the terminal type. The HTTP message is received at the mobile display appliance server 28 in the request handler unit 302 and the user information, included as content to the HTTP messages POST or GET. The received HTTP message content includes session identification, which includes the type of the terminal information and user selection information. The received HTTP message includes as user selection information, the command user selected, the selected object, and possibly other service application information. The request handler 302 makes the selection in step 804 according to the application service identification that is received in the HTTP message and selects the right service available from the service control 304 where the message content is transferred. The service control 304 functions according to the user's information (the given command and selected object) in step 806 and as result of the selection creates response data in a XML format and identifies the XSL template by defining for example a name of the template. The identified XSL template may be for instance a "login screen". Then in the next step 808, the received XSL template name is chosen based on terminal identification information. The XSL template is terminal type specific due to different terminal capability to interpret, store and display the received information. The sizes of the terminal display and the terminal's capability to support certain signaling protocols determine which different XSL template is used with different types of terminals in step 808. For instance the first view after the terminal 20-20c is powered on is so called "login screen", which is identified in the previous step 806, and for instance if the terminal of the mobile system used "login screen mda," the screen is used in the next step 810. If a PC is the terminal type, then "login screen PC" is used in the step 810. If the used terminal is for instance Nokia's WAP mobile phone, the login screen, is in WML format (Wireless Markup Language) as specified by WAP forum, and is named for instance "login screen 7110" to be used in step 810. The page generator 306 in FIG. 7 receives the service selected response template, which is further processed in the page generator. The page generator in step 810 in FIG. 8 tailors the page according to the active user profile (which may also be multi user profile). For instance, language selection of the active user profile specifies that the page generator 306 translates all the text information into the defined language. The terminal's marker and selection devices are known according to the terminal type. Any other user interface specific means other than marker and selection means may also be defined according to the terminal type. U.S. patent application Ser. No. 09/607,369, entitled "User Interface Constructed From Components Created From a Set of Tags", describes the method of a page generation, that is applied in step 810 in FIG. 8 in the method of the invention. The page generation stage provides a method for generating display instructions by converting template containing style information into a final format, which converts for example data created in one language into a second language. The method for converting one machine-readable language for example XML or XSL into another for example HTML by applying instructions to a style template is described in the above referred patent application. At the mobile display appliance server 28, the HTML page is send from the HTML control 308 to the terminal in step 812. In the terminal 20-20c, the HTML page information (or WML information if WAP terminal is used) is received and displayed on the terminal screen in step 814 in FIG. 8 by the HTML control 300 (or alternatively by WML control block if WAP terminal is used). The steps described in FIG. 8 and explained above at the server side phases of the method may be at least partly be done in parallel order. The air interface protocol which is used at present is HTTP over the WLAN, but in the future the invention can be applied to other bearer and protocol environments over the air. For instance, possible alternatives are the GPRS, General Radio Packet Service specified by the ETSI or the third generation wireless terminal system specified by 3GPP. The previous processing steps 800-814 of FIG. 8 can then be done partly at the server side in the network and partly at the terminal in such a way, that on terminal side more steps of the method are performed. For simplicity, this will be explained as being processed on the mobile system server side. This is the preferable manner since it is best to have as much processing accomplished out of the wireless device in order to make it simpler and more portable.

When a response from the mobile display appliance server 28 or from the Internet 26 via a cellular network is sent back to the terminal 20-20c, the processing is in similar to that described in U.S. patent application Ser. No. 09/607,369.

Corresponding parts operate in a similar fashion but in a reverse order. Thus, it can be seen that any user selection information being transferred to the mobile display appliance server 28 has localization and component parsing performed before a response to the user selection is sent back to the terminal 20-20c.

Thus, each page is defined as an XML page template, which are parsed with general mobile system components like the service menus and object menus. After that the context of view information is parsed via a localization menu, which generates the view into the user's defined language. The localization menu uses user/family profile definitions. The next step is the localization script in which parsing produces an HTML page ready for the terminal to be transferred via WLAN. The localization and parsing can support terminals, that have more than one possible size of the display, but doing the necessary information processing in such a way, that the mobile terminal of a system is supported in an optimized way. That means, that depending on the memory of the terminal, possibly more information is sent to the terminal that can be shown in the display view at any one time. Other terminals, such as a fixed connected terminal to the network, may receive for example less information than the mobile terminal of the system.

When the user accesses a service, like a calendar service or retrieves information from the server 28, the browser 74 is the program product that is in charge of conveying the service specific information and the main view of the selected application, such as calendar service, from the mobile display appliance server 28 to the terminal 20-20c. When user information selection is sent from the terminal 20-20c to the mobile display appliance server 28, the transfer is made by applying the browser application of the terminal 74 and the server system 68, 68a or 68b. At the server side, the received HTML format user information is initially received in the browser 68 of FIG. 3 and part of the browser methods at server side uses the terminal client specific section 68a or 68b of the browser.

The software product updates are transmitted from the global upgrade server 38 in FIG. 1 and its configuration tool manager to the upgrade service unit 54 in FIG. 3 and its configuration tool client. The configuration tool client is the functional unit that acts when any configuration tool manager of the management server (not illustrated in FIG. 1) upgrades any software component, full executable software program or re-configures configuration parameters, application and system parameters and user interface style information such as terminal style templates.

When operating the wireless device, different activating mechanisms can be utilized, as described above. This may include an external mouse connected to the terminal, an external keyboard connected to the terminal, an virtual keypad that is displayed on the touch sensitive screen, a direct manipulation arrangement or an integrated roller in the terminal with roller control buttons. The operation of these different devices is herewith described.

When the external mouse is used for marking the object into which the user commands are to be directed, marking is done typically by pressing one button one time (left click). Application specific commands are typically selected from the menu, which affects the previously marked object. This is the basic mouse selection pattern currently used in most PC's.

When an external keypad is used, the marker may be activated by moving the active selection point up, down, left or right with the "arrow buttons" and the actual selection is done by the enter button. The alternative to using the arrow buttons is the use of the tab button in order to move the marking position from one object to another one at a time until the preferred object is selected. The command that is to be processed is given by pressing some button control such as the control button and at the same time a character button or by using two character buttons together. This kind of marking and selection is also generally known in standard PC's. If a virtual keypad is used, the marking and selection of the object may be done similarly as described with the external keypad situation, but instead of using arrow buttons or tabs, the user uses fingertips directly on displayed soft keys which are keypad buttons drawn on the touch sensitive display to look like hard button keys. This type of virtual keypad is described in U.S. patent application Ser. No. 09/607,359 filed Jun. 30, 2000.

When direct manipulation is used, the selection is accomplished by directly touching the object area in the touch sensitive display. A status indication of the process command can be shown in the display of the user interface. Direct manipulation methods are described in U.S. patent application Ser. No. 09/607,638 filed Jun. 30, 2000. The selected object is typically shown in different colors by highlighting or shading.

Numerous additional modifications and variations of the present invention are possible in light of the above teachings. It is therefore been understood that within the scope of the appended claims, the invention may be practiced otherwise than as specifically described herein.

What is claimed is:

1. A method comprising:
   processing and/or facilitating a processing of a selection of one or more objects that appear on a display using at least two independent selector devices configured to select the one or more objects;
   causing, at least in part, a placement of a focus marker to indicate a selected field of the display, the focus marker being moveable between at least two areas using a first selector device of the at least two independent selector devices; and
   causing, at least in part, a second selector device of the at least two selector devices to operate on objects that appear within the selected field of the display indicated by the first selector device.

2. A method of claim 1, further comprising:
   causing, at least in part, a display of an object menu icon associated with the display.

3. A method of claim 2, wherein the object menu comprises a plurality of icons, each of the icons being associated with different objects on the display.

4. A method of claim 1, wherein the at least two independent selector devices comprise a touch screen and virtual keys.

5. A method of claim 1, further comprising:
   causing, at least in part, a transfer of user selection information to a server, the server being configured to respond to a device having the display; and determining to localize and parse selection response information before responding to the device having the display.

6. A method of claim 1, wherein a device having the display is wirelessly connected to a network.

7. A method of claim 1, further comprising:
   causing, at least in part, a selection of an information template; and
   determining to localize and parse selection response information so as to support a multiple size display of a device having the display, before a response to the selection is sent to the device having the display.

8. A method of claim 1, further comprising:
   causing, at least in part, a selection of an information template; and
   determining to localize and parse selection response information such that the focus marker is supported for a device having the display and added to view before sending a response to the device having the display.

9. A method of claim 1, further comprising: causing, at least in part, downloading, from a management server, a user interface style template configured to be used when a service is displayed.

10. An apparatus comprising:
    at least one processor; and at least one memory including computer program code, the at least one memory and the computer program code configured to, with the at least one processor, cause the apparatus to perform at least the following:
    process a selection of one or more objects that appear on a display using at least two independent selector devices configured to select the one or more objects;
    cause, at least in part, placement of a focus marker to indicate a selected field of the display, the focus marker being moveable between at least two areas using a first selector device of the at least two independent selector devices; and
    cause, at least in part, a second selector device of the at least two selector devices to operate on objects that appear within the selected field of the display indicated by the first selector device.

11. An apparatus of claim 10, wherein the apparatus is further caused to: display an object menu icon associated with the display.

12. An apparatus of claim 11, wherein the object menu comprises a plurality of icons, each of the icons being associated with different objects on the display.

13. An apparatus of claim 10, wherein the at least two independent selector devices comprise a touch screen and virtual keys.

14. An apparatus of claim 10, wherein the apparatus is further caused to:
    transfer user selection information to a server, the server being configured to respond to a device having the display; and
    localize and parse selection response information before responding to the device having the display.

15. An apparatus of claim 10, wherein a device having the display is wirelessly connected to a network.

16. An apparatus of claim 10, wherein the apparatus is further caused to:
    select an information template; and
    localize and parse selection response information so as to support a multiple size display of a device having the display, before a response to the selection is sent to the device having the display.

17. An apparatus of claim 10, wherein the apparatus is further caused to:
    select an information template; and
    localize and parse selection response information such that the focus marker is supported for a device having the display and added to view before sending a response to the device having the display.

18. An apparatus of claim 10, wherein the apparatus is further caused to:
    download, from a management server, a user interface style template configured to be used when a service is displayed.

19. A system comprising:
a mobile device configured to process a selection of one or more objects that appear on a display using at least two independent selector devices configured to select the one or more objects, process a placement of a focus marker to indicate a selected field of the display, the focus marker being moveable between at least two areas using a first selector device of the at least two independent selector devices, and process an operation of a second selector device of the at least two selector devices to operate on objects that appear within the selected field of the display indicated by the first selector device; and
a server configured to wirelessly communicate with the mobile device over a network.

20. The system of claim 19, wherein the at least two independent selector devices comprise a touch screen and virtual keys.

* * * * *